(12) United States Patent
Theisinger et al.

(10) Patent No.: US 9,903,688 B2
(45) Date of Patent: Feb. 27, 2018

(54) SCOPE

(71) Applicant: SUPAS LTD, Hong Kong (CN)

(72) Inventors: Hermann Theisinger, Vienna (AT); Zhao Wang, Shanghai (CN)

(73) Assignee: SUPAS LTD, Hong Kong (CN)

( * ) Notice: Subject to any disclaimer, the term of this patent is extended or adjusted under 35 U.S.C. 154(b) by 0 days.

(21) Appl. No.: 14/536,230

(22) Filed: Nov. 7, 2014

(65) Prior Publication Data
US 2015/0128472 A1 May 14, 2015

Related U.S. Application Data

(60) Provisional application No. 61/901,626, filed on Nov. 8, 2013.

(51) Int. Cl.
*G02B 23/02* (2006.01)
*F41G 1/38* (2006.01)
*G02B 23/16* (2006.01)

(52) U.S. Cl.
CPC ............... *F41G 1/38* (2013.01); *G02B 23/02* (2013.01); *G02B 23/16* (2013.01)

(58) Field of Classification Search
CPC ............ F41G 1/38; G02B 33/02; G02B 23/16
USPC .................................................. 42/122, 123
See application file for complete search history.

(56) References Cited

U.S. PATENT DOCUMENTS

| | | | | | |
|---|---|---|---|---|---|
| 2,398,276 | A | * | 4/1946 | Altman | G02B 15/04 359/422 |
| 2,430,549 | A | * | 11/1947 | Altman | G02B 23/08 359/399 |
| 2,620,706 | A | * | 12/1952 | Levin | G02B 25/001 359/399 |
| 3,972,056 | A | * | 7/1976 | Tsujimoto | G02B 15/14 250/201.7 |
| 7,827,723 | B1 | * | 11/2010 | Zaderey | F41G 1/38 42/122 |
| 2004/0232349 | A1 | * | 11/2004 | Kruit | B82Y 10/00 250/396 R |
| 2006/0050940 | A1 | * | 3/2006 | Satoh | G01S 17/88 382/128 |
| 2009/0015935 | A1 | * | 1/2009 | Szapiel | F41G 1/38 359/674 |
| 2014/0130395 | A1 | * | 5/2014 | Scroggins | F41G 1/467 42/122 |

* cited by examiner

*Primary Examiner* — Stephen Johnson
(74) *Attorney, Agent, or Firm* — ATIP Law; Ian Burns

(57) ABSTRACT

A scope for a rifle provides a wide field of view and safe eye relief. The scope includes an objective lens group and an ocular lens group, one lens of the ocular lens group being at least 10% greater in diameter than the first lens of the objective lens groups. Focal lengths of the lenses of the ocular lens groups satisfy relationships to provide safe eye relief and a proper distribution of power amongst the lens groups.

14 Claims, 7 Drawing Sheets

SCOPE

CROSS REFERENCE TO RELATED APPLICATIONS

This application claims priority to U.S. provisional patent application Ser. No. 61/901,626, filed 8 Nov. 2013, the contents of which are herein incorporated by reference.

FIELD OF THE INVENTION

The present invention relates to scopes for firearms.

BACKGROUND

Compact prismatic sights are typically used for very close range to mid range shooting. A typical application besides hunting moving game is in the field of infantry service. Mounted onto assault rifles the prismatic sight helps the infanterist to defend himself in the battlefield. Compactness, low profile, low weight, simple operation, low cost, a safe eye relief and most of all a wide field of view are key criteria for the market success of such a sight.

In order to achieve a reasonably long eye relief plus a significantly wider field of view the eye piece has to be increased in size thus adding to the weight and increasing production cost of the relevant sight. What is required is a firearm sight or scope that can increase the field of view while maintaining an ergonomic and safe eye relief, a low weight, a low profile and compact dimensions.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to provide a scope with a wide field of view; and provide a compact scope;

provide a lightweight scope;

provide a scope with safe eye relief;

provide a scope with ergonomic sight adjustment;

provide a scope with a low profile.

These and other advantages may be realized by reference to the remaining portions of the specification, claims, and abstract.

BRIEF DESCRIPTION OF ONE EMBODIMENT OF THE PRESENT INVENTION

In one aspect of the present invention, there is a provided a scope for firearms comprising an ocular lens group, an erector group and an objective lens group. The ocular lens group may have a focal length $f_e$ and may include a first ocular lens comprising a focal length $f_{oc1}$, a second ocular lens comprising a focal length $f_{oc2}$ and a third ocular lens comprising a focal length $f_{oc2}$. The lenses of the ocular lens group may comprise one or more of the following relationships:

$d \geq 0.3 f_e$ $-2.5 f_e \leq f_{oc1} \leq -1.5 f_e$ $0.8 f_e \leq f_{oc2,oc3} \leq 0.9 f_e,$ where $f_{oc2,oc3}$ is the combined focal length of the second ocular lens and the third ocular lens. Optionally, the first ocular lens also satisfies the requirement $-2.5 f_e \leq f_{oc1} \leq -1.5 f_e$.

In one aspect of the present invention, there is provided a firearm scope comprising at least one ocular lens and at least one objective lens, wherein at least one of the at least one ocular lens is at least 10% larger in diameter than a first objective lens, being the objective lens nearest an object end of the scope. Optionally, at least one ocular lens may be at least 15% larger in diameter than the first objective lens.

In one aspect of the present invention, there is provided a firearm scope comprising ocular lens means disposed toward an ocular end of the scope, objective lens means disposed toward an objective end of the scope and housing means for housing the ocular lens means and the objective lens means. The ocular lens means has a diameter that is at least 10% larger than the objective lens means.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
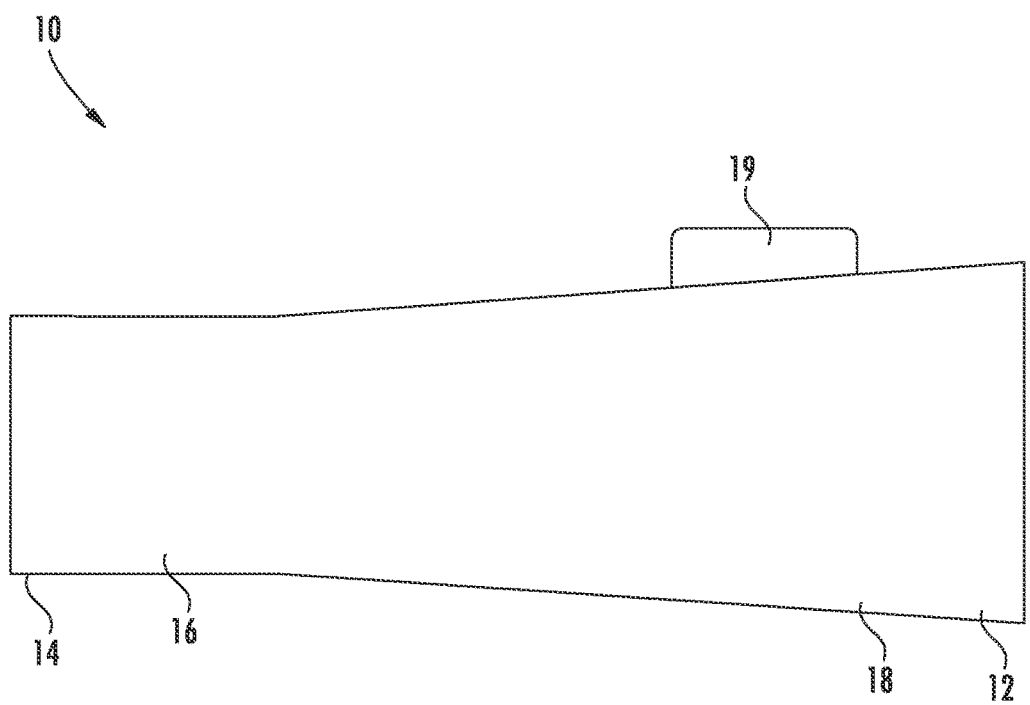
FIG. 1 is substantially a side view of one embodiment of the scope of the present invention.

In FIG. 1, there is shown a scope for a firearm in accordance with one embodiment of the invention. The scope is indicated generally at 10. The scope includes an ocular end 12 and objective end 14. The scope includes an objective end housing 16 and an ocular end housing 18. The housings may be combined into a single integral and continuous housing as shown in FIG. 1. The housings increase generally in diameter from the objective end 14 toward the ocular end 12. In one embodiment, the housing diameter does not necessarily increase continuously along the longitudinal axis from the objective end to the ocular end but does not decrease along any section from the objective end to the ocular end. Each of the objective end 14 and ocular end 12 may include dust covers or lens caps (not shown) as is known in the art. Alternatively or in addition, the ocular end housing 18 may include a rubber cap for additional eye protection, as is also known. The housing includes caps covering elevation and windage adjustment screws (i.e. vertical and horizontal adjustment). Cap 19 for elevation adjustment is shown in FIG. 1. The scope may be a fixed lens system or may have adjustability at the objective or ocular ends.

Figure 2:
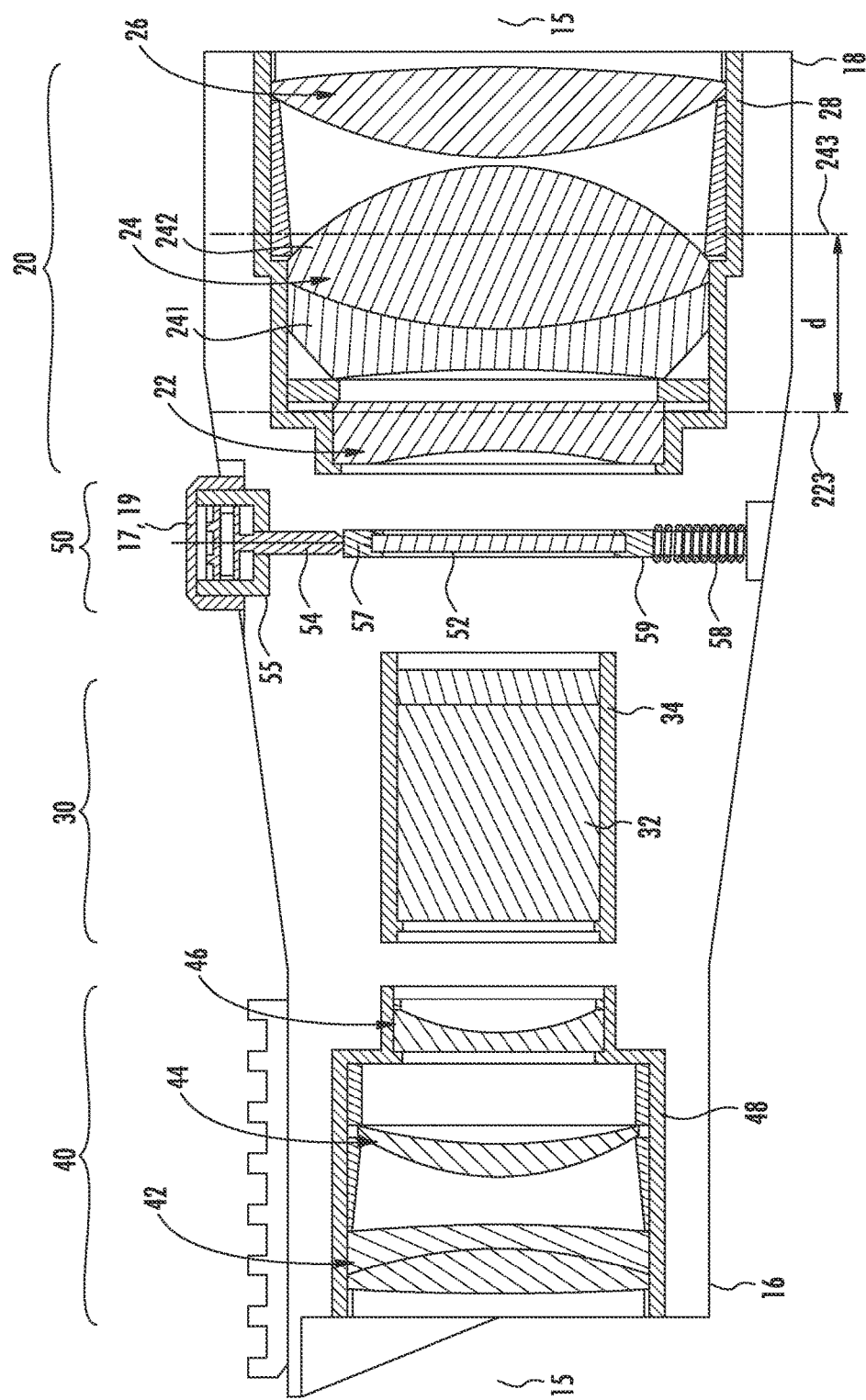
FIG. 2 is substantially a side cross section showing the internal optical components of the scope.

FIG. 2 illustrates the internal lens components of the scope 10. The lens components include an ocular group 20, an erector group 30 and an objective group 40.

The objective group 40 includes a first objective lens 42 having a focal length $f_{ob1}$, a second objective lens 44 having a focal length $f_{ob2}$ and a third objective lens 46 having a focal length $f_{ob3}$.

Each of the first objective lens 42, the second objective lens 44 and the third objective lens 46 is fixedly mounted within an objective group housing 48 that is itself disposed within the objective end housing 16. The first objective lens 42 is the most outward of the lenses of the objective group 40, i.e. nearest an object end of the scope such that in use, the first objective lens 42 will be nearest the object. The objective group 40 is mounted about a longitudinal axis 15 of the scope 10. In one embodiment, the objective group 40 is rotationally symmetrical about the longitudinal axis 15, though in other embodiments, rotational symmetry of the objective group 40 is not an essential characteristic.

The objective lens group 40 is preferably constructed to satisfy the following conditions:

$$f_{ob1,ob2} = -f_{ob3} \quad (1)$$

$$0.3f_o \leq f_{ob1,ob2} \leq 0.4f_o \quad (2)$$

wherein:
$f_{ob1,ob2}$ is the combined focal length of the positive lens 42 and the lens 44; and
$f_o$ is the focal length of entire objective lens group 40 (i.e. lens 42, lens 44 and lens 46).

Satisfying condition (1) controls the large Petzval radius (flatten image) and assures small field curvature and small longitudinal/lateral color aberrations of the entire objective group 40.

Regarding condition (2), the value of $f_{ob1,ob2}$ smaller than $0.3f_o$, means that the refraction power of the objective elements is large, causing spherical aberration. A value of $f_{ob1,ob2}$ exceeding $0.4f_o$, increases the objective total length, thereby increasing size.

The ocular group 20 includes a first ocular lens 22 having a focal length $f_{oc1}$, a second ocular lens 24 having a focal length $f_{oc2}$ and a third ocular lens 26 having a focal length $f_{oc3}$. The third ocular lens 26 is closest to the eye of the user in operation.

The second ocular lens 24 is a doublet cement lens including a negative lens element 241 and a biconvex lens element 242. In an alternative embodiment, the second ocular lens 24 may be a plastic aspherical lens.

Each of the first ocular lens 22, the second ocular lens 24 and the third ocular lens 26 is fixedly mounted within an ocular group housing 28 that is itself disposed within the ocular end housing 18. The ocular group 20 is mounted about a longitudinal axis 15 of the scope 10. In one embodiment, the ocular group 20 is rotationally symmetrical about the longitudinal axis 15, though in other embodiments, rotational symmetry is not an essential characteristic.

The ocular lens group 20 is preferably constructed to satisfy the following conditions:

$$d \geq 0.3f_e \quad (3)$$

$$V_a \leq 25, V_b \geq 60 \quad (4)$$

$$-2.5f_e \leq f_{oc1} \leq -1.5f_e \quad (5)$$

$$0.8f_e \leq f_{oc2,oc3} \leq 0.9f_e \quad (6)$$

wherein:
d, shown in FIG. 2, is the distance between the principal planes 223, 243 of the first ocular lens 22 and the second ocular lens 24 respectively;
$f_e$ is the focal length of entire ocular group 20;
$V_a$ is the Abbe number of the negative lens element 241 in the second ocular lens 24;
$V_b$ is the Abbe number of the biconvex lens element 242 in the second ocular lens 24; and
$F_{oc2,oc3}$ is the combined focal length of the second ocular lens 24 and the third ocular lens 26;

Condition (3) assures sufficiently long eye relief (the distance between the lens surface that is the closest to the eye point) to more than $1.6f_e$ length.

Condition (4) provides satisfactory correction for chromatic aberration of the ocular system 20.

Conditions (5) and (6) set the focal lengths $f_{oc1}$ and $f_{oc2,oc3}$ of the ocular lens, respectively, as compared with the focal length $f_e$ of the entire ocular lens, so that a proper distribution of power is obtained among the lens groups. When the upper limit of Condition (5) is exceeded, the first ocular lens has more negative power and the lens group 24 and 26 has relatively more power, creating an imbalance in the aberrations. When the lower limit of Condition (5) is not satisfied, the lens 22 has less negative power, increasing the overall length and size of the ocular.

When the upper limit of Condition (6) is exceeded, the lens group 24 and 26 has less power and the lens 22 has relatively less negative power, increasing the overall length and size of the ocular. When the lower limit of Condition (6) is not satisfied, the lens 22 has more negative power, creating an imbalance in the aberrations.

In one embodiment, the erector system 30 is a relatively large dimension erector system 32 including spherical lens elements or plain optical elements. Examples of suitable erector systems include a Schmidt-Pechan or Abbe-Koenig glass prism. These types of erectors ensure that a wide Field of View (FoV) can be achieved. In one particular example, a Schmidt-Pechan type prism is used in the scope as an image erecting system by rotating the image by 180 degrees (both invert and revert the image). When used in a wide angle scope system, it's preferable to get enough total internal reflections angle (<40 degree) to avoid reflection losses at full field incidence angle. Accordingly, to achieve these characteristics, in some embodiments the refractive index of prism glass should be larger than 1.556. To avoid chromatic dispersion that the prism may add in the system, the dispersive index of prism glass may be larger than 55. One suitable material for use as the prism is barium crown glass, such as SCHOTT N-BAK4 (Chinese H-BAK7) glass.

The erector prism unit is located between the objective and eyepiece, is fixed substantially perpendicular to the optical axis, and will not typically move during normal using. The longitudinal position of the prism may be calculated to avoid ray cut.

Alternative erector systems that may be employed include, without limitation, a mirror-prism type erector system or a prismatic system with an offset of the optical light path such as Porro-type prisms or similar.

Figure 3:
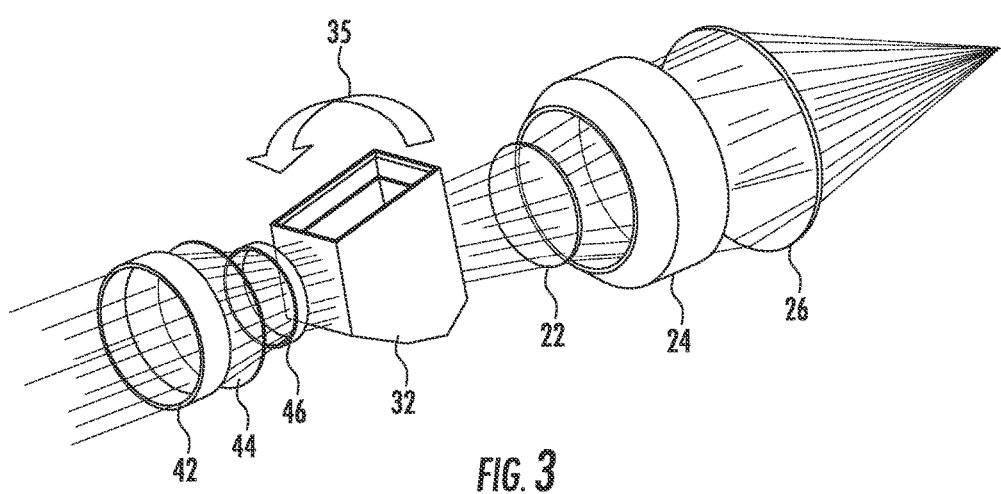
FIG. 3 is substantially a view of light paths through the optical components of the scope.

The erector prism 32 shown in FIG. 2 is mounted within an erector housing or cage 34 within the scope housing. FIG. 3 shows the optical elements of the scope 10 including exemplary light paths through the lens system. Typically, such erectors would be mounted vertically, that is being taller than they are wide. However, in one or more embodiments of the invention, the erector prism 32 may be rotated about the longitudinal axis 15 (rotation indicated by the arrow 35 in FIG. 3) to be mounted in an angled, non-upright position between 2° and 358°, to achieve an overall low profile and/or better viewing ergonomics, thus reducing height at the cost of width and/or optimizing viewing ergonomics (sighting line). In one embodiment, the erector prism 32 has a minimum width of 28 mm and a minimum height of 16 mm, though these minimums are not considered essential and a smaller erector prism may be employed without departing from the spirit or scope of the invention. In one specific embodiment, the prism dimensions l/w×h are 25 mm/35×20 mm.

Figure 4:
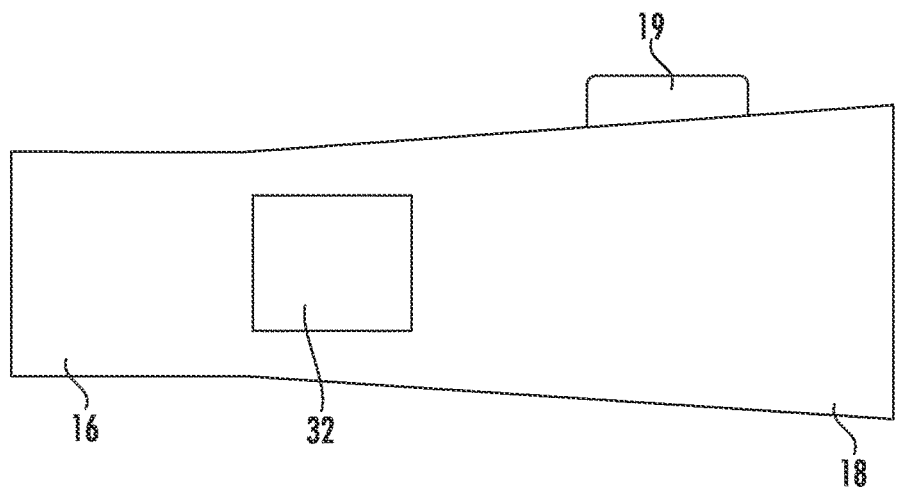
FIG. 4 is substantially a side view of an erector prism within the scope housing.
Figure 5:
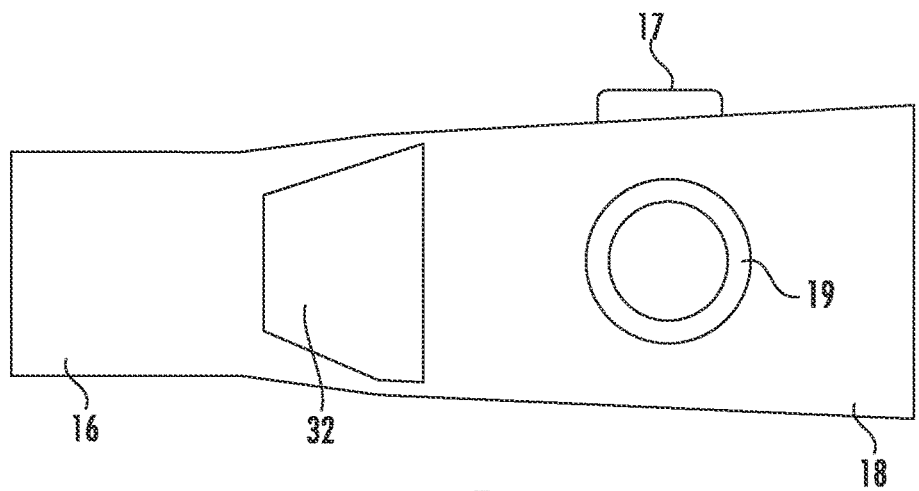
FIG. 5 is substantially a top view of the erector prism within the scope housing.

FIG. 4 shows a side view while FIG. 5 shows a top view. The cone-shape form factor, i.e. housing 16, 18, is pointed towards the front rather than to the rear (industry standard). It is considered that this arrangement is generally more robust than the industry standard arrangement. The housing does not have a rotationally-symmetric geometry towards the front due to the wide and low prism element 32 (tilted 90° for lower profile).

Figure 6:
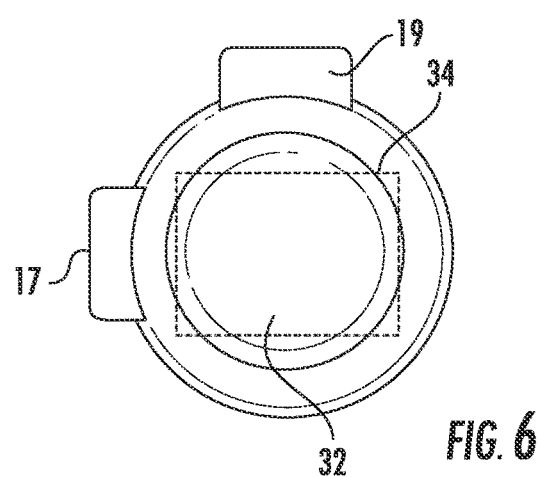
FIG. 6 is substantially an end view showing the prism cage.

FIG. 6 is a front view with visualization of the rectangular prism stool (cage) 34. FIG. 6 also more clearly illustrates the caps for the elevation 19 and windage 17 adjustment mechanisms.

Figure 7:
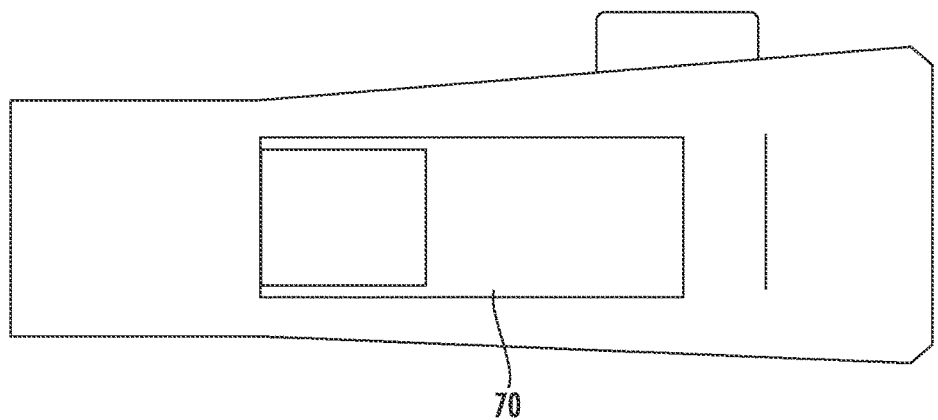
FIG. 7 substantially shows a tilted erector/reticle system in a straight center position.
Figure 8:
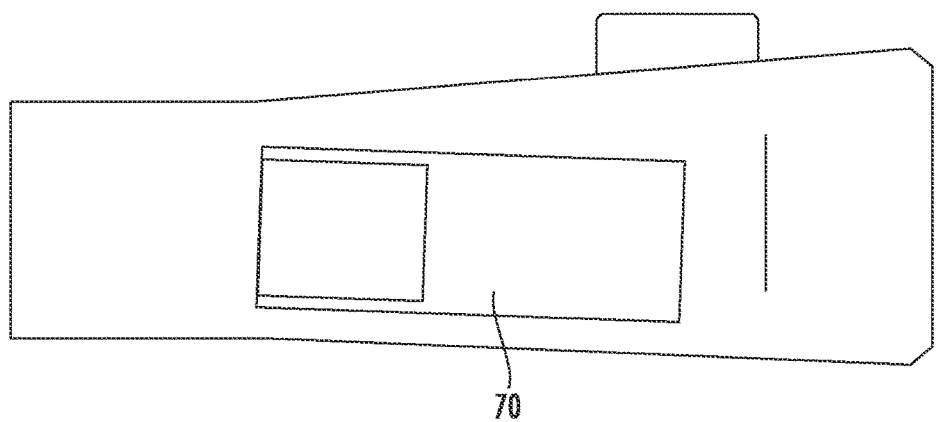
FIG. 8 substantially shows the tilted erector/reticle system in an extreme tilted position.

In one embodiment, the erector system 30 is mounted in a fixed position towards the objective thus reducing cost and improving shock-proofing. In one embodiment, the scope comprises a fixed, not mechanically moveable objective-erector system group (non-centered design). In one embodiment, there may be employed a tilted erector/reticle system with either a centered or non-centered design. FIG. 7 shows a tilted erector system 70 (centered design) in a straight center position while FIG. 8 shows the erector system 70 in an extreme tilted position.

As described above, the scope housing generally increases in diameter along the longitudinal axis from the objective end to the ocular end. This is to accommodate the larger ocular lens relative to the first objective lens 42 (i.e. the lens closest to the object). The largest ocular lens need not necessarily be the lens closest to the eye, i.e. the third ocular lens. In one embodiment, at least one ocular lens is at least 10% larger in diameter than the first objective lens 42. In one embodiment, at least one ocular lens is at least 15% larger in diameter than the first objective lens 42. In one embodiment, at least one ocular lens is at least 20% larger in diameter than the first objective lens 42.

The rotationally-symmetrical ocular housing points forward towards a non-rotationally symmetrical prism housing. The front bell (objective housing) is again rotationally-symmetrical though may be non-rotationally-symmetrical in alternative embodiments.

In one or more embodiments, the scope may have characteristics falling within the following parameters which are provided by way of example only and are not intended to be limiting. A person skilled in the art will readily understand that parameters outside of any specified minimums or maximums may be employed while still remaining functionally equivalent to the invention as defined by any claims that follow this description. In one embodiment, the magnification range of the scope is 2.5-times to 8-times. In one embodiment, the scope has an entry pupil of 25 mm to 42 mm. In one embodiment, the scope has a roof prism system with a minimum width of 28 mm and a minimum height of 16 mm. In one embodiment, the scope has an exit pupil of at least 90% of the ratio 'Entry pupil divided by magnification'.

In one embodiment, the scope has a subjective field of 34° to 44° in combination with an eye relief of 53 mm, or with the subjective field scaled down or up to eye reliefs of 37 mm to 77 mm. In one embodiment, the scope utilizes one or more non-glass material lenses such as plastic lenses used in the photographic industry.

In a specific embodiment, a scope in accordance with the invention may have the following characteristics:

Telescopic System/8 lens, 2 prism (Schmidt-Pechan 90° tilted)
Total Length: 135 mm
Objective Diameter: 30 mm
Ocular Max Diameter (last lens): 44 mm
Schmidt-Pechan prism system, H-BAK7 glass, length 25 mm, width 35 mm, height 20 mm
Eye Relief: 53 mm
Exit Pupil Diameter: 7 mm
Field of view: 10°/Field of view @ 100 yds: 52.5 feet/Field of view @ 100 m: 17.5 m
Magnification: 4×
Max distortion: 5.2%/Max vignetting (at full field): 35%
Center resolution: better than 6"/Inner ⅔ field resolution: better than 8"
Full field resolution: better than 12"

Returning to FIG. 2, there is also shown a reticle system 50. The reticle system 50 includes a reticle element 52 which may include one or more aiming marks, as is known in the art. The reticle element 52 is moveable by a screw 54 that engages a threaded housing 55 covered by a protection cap 17, 19. The screw 54 engages a first edge of the reticle element 52. A spring 58 is mounted on the opposite side of the scope housing to the screw and engages an opposite edge 59 of the reticle element 52 so that when the screw 54 is unwound, the spring 58 biases the reticle element against the screw 54. While only a single reticle system 50 is depicted in FIG. 2, the scope 10 will typically comprise two reticle systems providing horizontal and vertical adjustment.

A typical windage adjustment design comes with a turret on top of the scope moving a spindle (reticle or erector system including reticle) in the Y-axis up and down (so called elevation). A second turret is typically located on the right side (from the shooter perspective) moving a spindle in X-axis left and right. The disadvantage of this X/Y-concept is the exposed turret position on top and often a higher profile of the scope. Also the space of a Picatinny rail for mounting other accessories on top and left/right is limited. In one alternative embodiment, the reticle movement may be centered or non-centered and may travel at angles other than the standard X- and Y-axis, such as in 45°-angles rather than the market standard X- and Y-axis, thereby allowing the adjustment turrets to be mounted in other than the vertical and horizontal positions.

Figure 9:
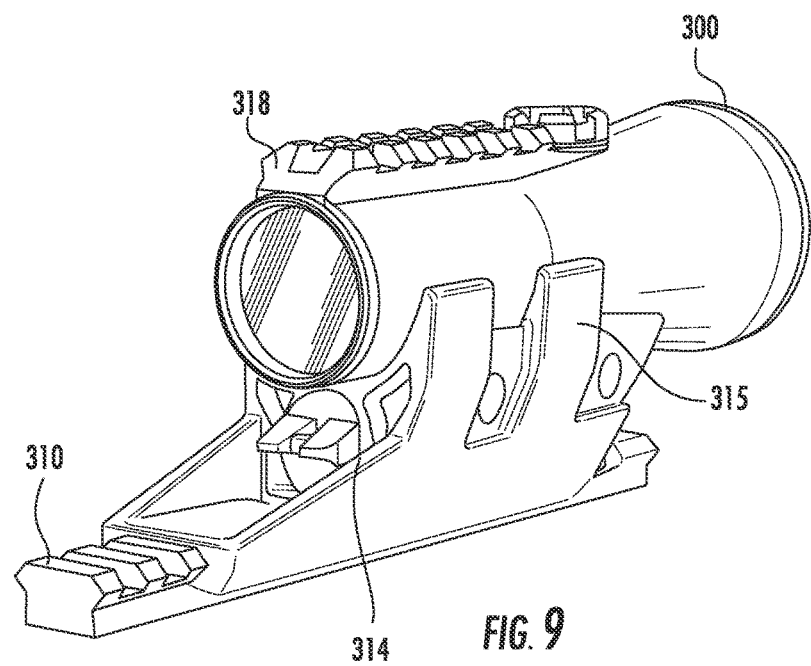
FIG. 9 substantially shows a scope mounted via a cradle to a Picatinny rail.
Figure 10:
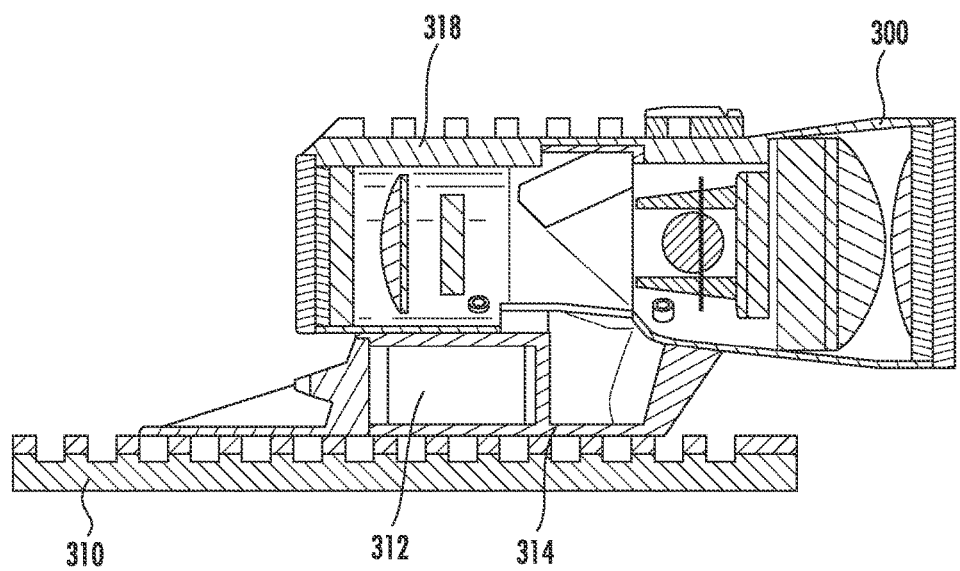
FIG. 10 substantially shows a battery compartment within the cradle of FIG. 9.

In some applications, there may be one or more powered components used in association with the rifle scope. For example, power may be required for night vision components, laser sights, image recording, etc. FIGS. 9 and 10 show an embodiment for mounting of the scope 300 mounted on a Picatinny rail 310. In order to provide power to any powered components, a battery 312 may be provided in a battery compartment 314. The battery compartment 314 may be profiled to provide a cradle 315 for the scope 300. The battery compartment may also be configured to engage the Picatinny rail 310. The battery 312 may be accommodated beneath the scope housing that is forward of the ocular housing, i.e. in the lesser diameter section of the scope housing that accommodates the objective. This has the advantage of housing the battery with maximum protection and without increasing the profile of the scope. An upper Picatinny rail 318 may be secured on the upper surface of the objective end housing 16 to provide a mounting for any additional components as may be required.

Figure 11:
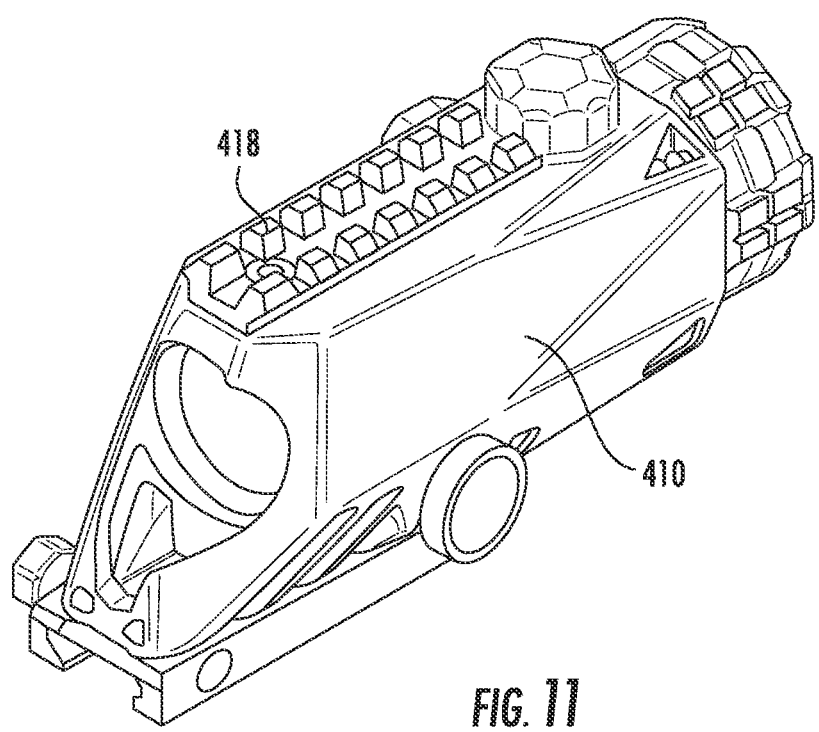
FIG. 11 substantially shows a scope mounted via an external housing.

An alternative embodiment of the scope is depicted in FIG. 11. In this embodiment, the lens housings 16, 18 are accommodated within an external housing 410 that is used in place of the cradle 315 depicted in FIGS. 9 and 10. The outer housing 410 may be a single molded piece or multiple pieces and may incorporate an upper Picatinny rail 418. The lens assembly including the lens housings 16, 18 may be secured within the external housing 410. The external housing surrounds the lens housings and provides greater protection to the lens components without adding significant weight or bulk. In addition, the upper surface of the outer housing is more suitably able to provide a surface for the upper Picatinny rail 418. The external housing 410 may have an access hatch (not shown) or similar to a storage space underneath the object end of the lens assembly that can house a battery. The hatch may be formed on one side of the external housing 410.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A scope for firearms comprising:
   (A) an ocular lens group at an ocular end of the scope, the ocular lens group comprising a focal length $f_e$;
   (B) an objective lens group comprising one or more objective lenses at an objective end of the scope; and
   (C) an erector group between the ocular lens group and the objective lens group;
   (D) the ocular lens group comprising:
      (a) a first ocular lens closest to the objective lens group, the first ocular lens comprising a focal length $f_{oc1}$;
      (b) a second ocular lens comprising a focal length $f_{oc2}$; and
      (c) a third ocular lens closest to the ocular end of the scope, the third ocular lens comprising a focal length $f_{oc3}$;
   (E) wherein the first ocular lens, the second ocular lens and the third ocular lens of the ocular lens group satisfy the relationships:

(a) $-2.5f_e \leq f_{oc1} \leq -1.5f_e$; and (b) $0.8f_e \leq f_{oc2,oc3} \leq 0.9f_e$;

wherein $f_{oc2,oc3}$ is a combined focal length of the second ocular lens and the third ocular lens and wherein d is a distance between a first principal plane of the first ocular lens and a second principal plane of the second ocular lens.

2. The scope of claim 1 wherein the second ocular lens is a doublet lens comprising a negative lens element and a biconvex lens element.

3. The scope of claim 2 wherein the second ocular lens satisfies the relationship:

(A) $V_a \leq 25$, $V_b \geq 60$;

(B) wherein $V_a$ is the Abbe number of the negative lens element and $V_b$ is the Abbe number of the biconvex lens element.

4. The scope of claim 1 wherein the second ocular lens is a plastic aspherical lens.

5. The scope of claim 1 wherein the objective lens group comprises:
   (A) a first objective lens closest to the objective end of the scope, the first objective lens comprising a focal length $f_{ob1}$;
   (B) a second objective lens comprising a focal length $f_{ob2}$; and
   (C) a third objective lens comprising a focal length $f_{ob3}$.

6. The scope of claim 5 wherein the first objective lens, second objective lens and third objective lens of the objective lens group satisfy one or more of the relationships:

(A) $f_{ob1,ob2} = -f_{ob3}$; and (B) $0.3f_o \leq f_{ob1,ob2} \leq 0.4f_o$;

wherein $f_{ob1,ob2}$ is the combined focal length of the first objective lens and the second objective lens, and wherein $f_o$ is the focal length of entire objective lens group.

7. The scope of claim 5 wherein the first objective lens, second objective lens and third objective lens of the objective lens group satisfy all of the relationships:

(A) $f_{ob1,ob2} = -f_{ob3}$; and (B) $0.3f_o \leq f_{ob1,ob2} \leq 0.4f_o$;

wherein $f_{ob1,ob2}$ is the combined focal length of the first object lens and the second objective lens, and wherein $f_o$ is the focal length of entire objective lens group.

8. The scope of claim 5 wherein at least one ocular lens is at least 10% larger in diameter than the first objective lens.

9. The scope of claim 8 wherein at least one ocular lens is at least 15% larger in diameter than the first objective lens.

10. The scope of claim 1 wherein the erector group is mounted within the scope such that a width of the erector is greater than a height of the erector.

11. The scope of claim 1 wherein a refractive index of the erector group is greater than 1.55.

12. The scope of claim 1 comprising a housing having a diameter that increases from the objective end to the ocular end.

13. The scope of claim 1 comprising a reticle mounted between the erector and the ocular lens group.

14. A scope for firearms comprising:
(A) an ocular lens group at an ocular end of the scope, the ocular lens group comprising a focal length $f_e$;
(B) an objective lens group comprising one or more objective lenses at an objective end of the scope; and
(C) an erector group between the ocular lens group and the objective lens group;
(D) the ocular lens group comprising:
  (a) a first ocular lens closest to the objective lens group, the first ocular lens comprising a focal length $f_{oc1}$;
  (b) a second ocular lens comprising a focal length $f_{oc2}$; and
  (c) a third ocular lens closest to the ocular end of the scope, the third ocular lens comprising a focal length $f_{oc3}$;
(E) wherein the first ocular lens, the second ocular lens and the third ocular lens of the ocular lens group satisfy the relationship:

(a) $2.5f_e \leq f_{oc1} \leq -1.5f_e$.

* * * * *